United States Patent
Carr et al.

(10) Patent No.: US 9,286,682 B1
(45) Date of Patent: Mar. 15, 2016

(54) ALIGNING MULTI-VIEW SCANS

(71) Applicant: Adobe Systems Incorporated, San Jose, CA (US)

(72) Inventors: Nathan A. Carr, San Jose, CA (US); Zhili Chen, Columbus, OH (US); Byungmoon Kim, Sunnyvale, CA (US); Linjie Luo, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/550,767

(22) Filed: Nov. 21, 2014

(51) Int. Cl.
*G06K 9/32* (2006.01)
*G06T 7/00* (2006.01)
*G06T 5/40* (2006.01)
*G06T 5/50* (2006.01)

(52) U.S. Cl.
CPC ............. *G06T 7/0028* (2013.01); *G06K 9/32* (2013.01); *G06T 5/40* (2013.01); *G06T 5/50* (2013.01)

(58) Field of Classification Search
CPC ... G06T 7/0024; G06T 7/0026; G06T 7/0028; G06T 7/0034
See application file for complete search history.

(56) References Cited

U.S. PATENT DOCUMENTS

| | | | | |
|---|---|---|---|---|
| 4,327,292 A * | 4/1982 | Wang | .................. | G03F 7/70375 250/398 |
| 8,165,354 B1 * | 4/2012 | Zhao | .................. | G06K 9/00228 382/118 |
| 8,269,836 B2 * | 9/2012 | Zandifar | ................ | G06T 7/0028 348/195 |
| 8,340,401 B2 * | 12/2012 | Matabosch I Gerones | ............. | G06K 9/00214 382/154 |
| 8,428,344 B2 * | 4/2013 | Fields | ..................... | G06K 9/209 382/112 |
| 2004/0228508 A1 * | 11/2004 | Shigeta | ............... | G06K 9/00026 382/124 |
| 2015/0035857 A1 * | 2/2015 | Lowe | ...................... | G09G 5/377 345/629 |
| 2015/0049317 A1 * | 2/2015 | Mishima | ............... | G03F 7/0002 355/67 |
| 2015/0169940 A1 * | 6/2015 | Kang | .................... | G06T 7/0024 382/118 |

* cited by examiner

*Primary Examiner* — Amir Alavi
(74) *Attorney, Agent, or Firm* — Wolfe-SBMC

(57) ABSTRACT

Alignment techniques are described that automatically align multiple scans of an object obtained from different perspectives. Instead of relying solely on errors in local feature matching between a pair of scans to identify a best possible alignment, additional alignment possibilities may be considered. Grouped keypoint features of the pair of scans may be compared to keypoint features of an additional scan to determine an error between the respective keypoint features. Various alignment techniques may utilize the error to determine an optimal alignment for the scans.

20 Claims, 7 Drawing Sheets

ALIGNING MULTI-VIEW SCANS

BACKGROUND

Aligning multiple scans coming from a collection of cameras with unknown pose can be a tedious process. For example the brute force approach to the problem is to manually measure and calibrate the position and alignment of the cameras prior to capture. Such an approach is cumbersome as this manual process must be repeated anytime a camera needs to be moved. An alternative approach is to require the system user to manually align the camera scans inside of the computer. This approach is also time consuming and tedious requiring significant expertise; one must be able to rotate aligned 3D objects digitally represented in the computer and be familiar with 3D interfaces.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Alignment techniques are described that automatically align multiple scans of an object. In one implementation, a partial alignment of the scans is formed that includes matches in keypoint features between the scans. An error may be computed between the partial alignment and additional keypoint features prior to determining whether a global alignment for the scans is to include the partial alignment. Determining whether to accept or reject the partial alignment in the global alignment is based upon comparing the computed error to a threshold established to prune potential alignments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
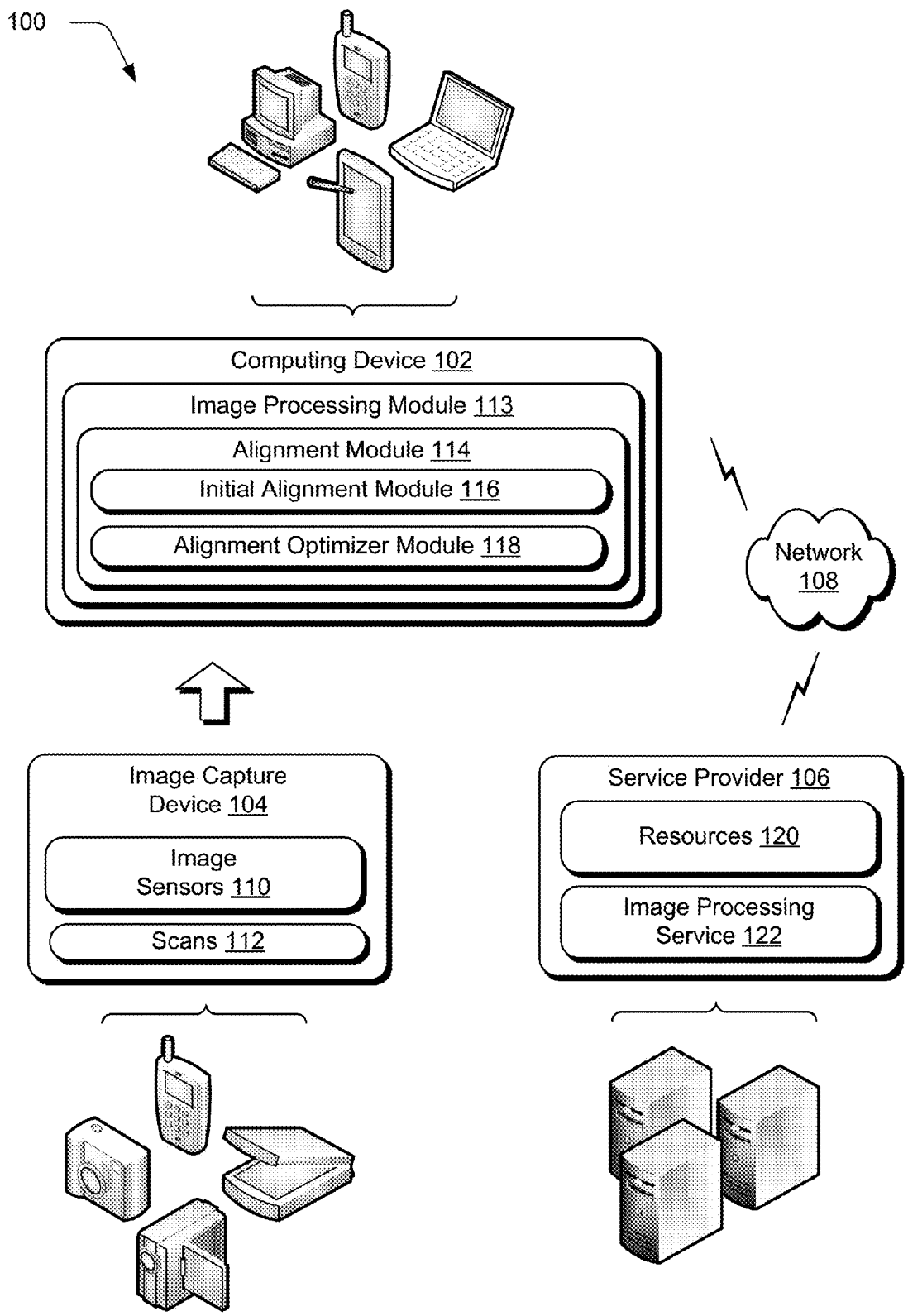
FIG. 1 is an illustration of an environment in an example implementation that is operable to employ techniques described herein.

Aligning multiple scans may be challenging because scans may be aligned in various ways. Computing various scan combinations may be time consuming and computationally expensive. For example, traditional alignment techniques may require input from a user thereby causing delays in alignment and introducing potentially unsuitable scan combinations. Further, computing an alignment between scans using traditional techniques strains computational resources without presenting the single best alignment to users. Accordingly, it may be difficult and frustrating for some users to utilize traditional alignment techniques for aligning multiple scans.

Alignment techniques are described that automatically align multiple scans of an object. In one implementation, a partial alignment of the scans is formed that includes matches in keypoint features between the scans. An error may be computed between the partial alignment and additional keypoint features prior to determining whether a global alignment for the scans is to include the partial alignment. Determining whether to accept or reject the partial alignment in the global alignment is based upon comparing the computed error to a threshold established to prune potential alignments.

A partial alignment may be formed in a variety of ways. For instance, a partial alignment may be formed by merging and/or combining two or more scans. In one implementation, a partial alignment is formed by aligning keypoint features that match between a pair of scans. Keypoint features may include points extracted from each scan (e.g., point clouds) that together define a feature of the object.

A partial alignment may be representative of a path of matching keypoint features between scans. Multiple alignment paths may exist depending upon a number of matched keypoint features between the scans. Thus, multiple partial alignments may be formed for a pair of scans with each partial alignment representing a path of matching keypoint features. In an alternative example, a partial alignment between scans may be formed between three or more scans. Here, a path of matching keypoint features between the three or more scans may represent the partial alignment. Whether a partial alignment of scans exists between a pair of scans or between three or more scans, the partial alignment is processed to determine whether to accept or reject the partial alignment in a global alignment.

A global alignment may represent a best possible alignment for the scans and includes accepted partial alignments. For instance, as will be described in greater detail below, a partial alignment between the scans may be formed and analyzed prior to determining whether the partial alignment is to be included in the global alignment. Accordingly, multiple partial alignments may be considered for the scans before one is accepted or rejected for inclusion in the global alignment. In one implementation, automatically aligning multiple scans of an object in the global alignment produces a 3D model representation of the object.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 and an image capture device 104, which may be configured in a variety of ways. Additionally, the computing device 102 may be communicatively coupled to one or more service providers 106 over a network 108. Generally speaking, a service provider 106 is configured to make various resources (e.g., content, services, web applications, etc.) available over the network 108, such as the Internet, to provide a "cloud-based" computing environment and web-based functionality to clients.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations. Additional details and examples regarding various configurations of computing devices, systems, and components suitable to implement aspects of the techniques described herein are discussed in relation to FIG. 7 below.

The image capture device 104 represented in FIG. 1 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, a laptop, a mobile phone or other implementation of a computing device having a built in image capture device 104. The image capture device 104 is illustrated as including image sensors 110 that are configured to form scans. In general, the image capture device 102 may capture and provide scans 112, via the image sensors 110, that may be stored on and further processed by the computing device 102 in various ways. Scans 112 may be obtained in other ways also such as by downloading scans from a website, accessing scans from some form of computer readable media, and so forth.

The scans 112 may be obtained by an image processing module 113. Although the image processing module 113 is illustrated as being implemented on a separate device it should be readily apparent that other implementations are also contemplated in which the image sensors 110 and image processing module 113 are implemented on the same device. Further, although illustrated as being provided by a computing device 102 in a desktop configuration, a variety of other configurations are also contemplated, such as remotely over a network 108 as service provided by a service provider, a web application, or other network accessible functionality. In addition or alternatively, the image processing module 113 may be implemented in a 3D scanning system.

Regardless of where implemented, the image processing module 113 is representative of functionality operable to manage scans 112 in various ways. Functionality provided by the image processing module 113 to manage scans may include but is not limited to functionality to organize, access, browse and view scans, as well as to perform various kinds of image processing operations upon selected scans. By way of example and not limitation, the image processing module 113 may include or otherwise make use of alignment module 114.

The alignment module 114 is representative of functionality to perform alignment techniques for automatically aligning multiple scans of an object. The alignment module 114, for instance, may be configured to form partial alignments that include matches in keypoint features between the scans 112. In at least some implementations, the alignment module 114 may 'backtrack' to consider multiple partial alignments prior to selecting one for inclusion in a global alignment. For example, the alignment module 114 may process each of the multiple partial alignments despite one of the partial alignments being associated with an error that indicates strong correspondence in matched keypoint features. Thus, the alignment module 114 may be configured to analyze the multiple partial alignments independent of whether one is identified as being a best alignment option based on the error.

The alignment module 114 may be further configured to generate an alignment graph with input scans as vertices (e.g., nodes) and alignments between scans as edges. Thus, a generated alignment graph may be used to enable forming a partial alignment. Computing errors associated with the formed partial alignment may also be enabled by the alignment graph by associating the computed error with each edge. Further, each edge or partial alignment may be associated with a number of inliers e.g., points which can be approximately fitted to a line.

In some implementations, the alignment module 114 may be configured to perform alignment techniques for automatically aligning multiple scans of an object in association with an application (not shown). By way of example and not limitation, the application may be configured as an image editor application, one example of which is Adobe Photoshop®. Other content and image editor applications are also contemplated. Here, an input received from the application may direct at least some of the alignment techniques performed by the alignment module 114. For example, the user may select a type of analysis desired from a menu included in the application. In some instances, the user selection may direct a frequency of the 'backtracking' e.g., a number of partial alignments processed prior to selecting one for inclusion in a global alignment. In this way, a user may receive a global alignment in accordance with their desire to wait while processing by the alignment module 114 completes. In addition or alternatively, a user may select a partial alignment via the application thereby ceasing additional processing by the alignment module 114.

By way of example and not limitation, the alignment module 114 may include or otherwise make use of an initial alignment module 116 and alignment optimizer module 118. The initial alignment module 116 is representative of functionality to produce an alignment of multiple scans based on keypoint extraction and feature matching. In an initial alignment, at least some of the scans are identified as having multiple possible alignments, or paths, among matching keypoint features. Any suitable extraction and/or feature correspondence techniques may be used to extract keypoints and determine feature correspondence between scans. In some implementations, the initial alignment module 116 may be configured to compute an error indicative of a minimum difference between the extracted keypoints and/or features. In one specific example, the error may be computed using an iterative closest point (ICP) algorithm, although any suitable pairwise technique may be used. While traditional techniques use this error to determine the alignment between the two scans, as described herein, the error may be used to select a partial alignment for further analysis.

For instance, the alignment optimizer module 118 may be configured to choose between two or more possible partial alignments formed during the initial alignment. The error indicative of the minimum difference between the extracted keypoints and/or features may be used to select the partial alignment associated with the lowest minimum difference for processing.

In some implementations, the alignment optimizer module 118 may be configured to determine whether to accept or reject the selected partial alignment. For instance, the alignment optimizer module 118 may be configured to process the partial alignment using a variety of different operations. Examples of these operations may include: compare keypoint features of the partial alignment to keypoint features of one or more additional scans, compute an error indicative of how well the respective keypoint features match when combined, and/or compare the computed error to a threshold established to prune alignment options, such as the partial alignment.

By way of example, a partial alignment may be rejected responsive to the comparison of the computed error to the threshold. In this example, the alignment optimizer module 118 may be configured to select another partial alignment and repeat at least some of the operations noted above.

Alternatively, the partial alignment may be accepted responsive to the comparison of the computed error to the threshold. In one implementation, accepted partial alignments are included in a global alignment as described herein. In some implementations, the alignment optimizer module 118 may be further configured to process an additional partial alignment before inserting the accepted partial alignment in the global alignment. In this implementation, multiple partial alignments between scans are processed even when one of the partial alignments has a lower error between the extracted keypoints and/or features of the scans. Accepting and rejecting partial alignments is further described in relation to FIGS. 3 and 4 as well as elsewhere.

As further shown in FIG. 1, the service provider 106 may be configured to make various resources 120 available over the network 108 to clients. In some scenarios, users may sign up for accounts that are employed to access corresponding resources from a provider. The provider may authenticate credentials of a user (e.g., username and password) before granting access to an account and corresponding resources 120. Other resources 120 may be made freely available, (e.g., without authentication or account-based access). The resources 120 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, scans, web documents, web pages, applications, device applications, and the like.

For example, the service provider 106 in FIG. 1 is depicted as including image processing service 122 which may implement various processing including scan alignment techniques described herein. The image processing service 122 represents network accessible functionality that may be made accessible to clients remotely over a network 108 to implement aspects of the techniques described herein. For example, functionality discussed in relation to alignment module 114 may be provided in whole or in part via the image processing service 122. Thus, the image processing service 122 may be configured to provide cloud-based access operable for automatically aligning scans as well as other operations described above and below.

Figure 2:
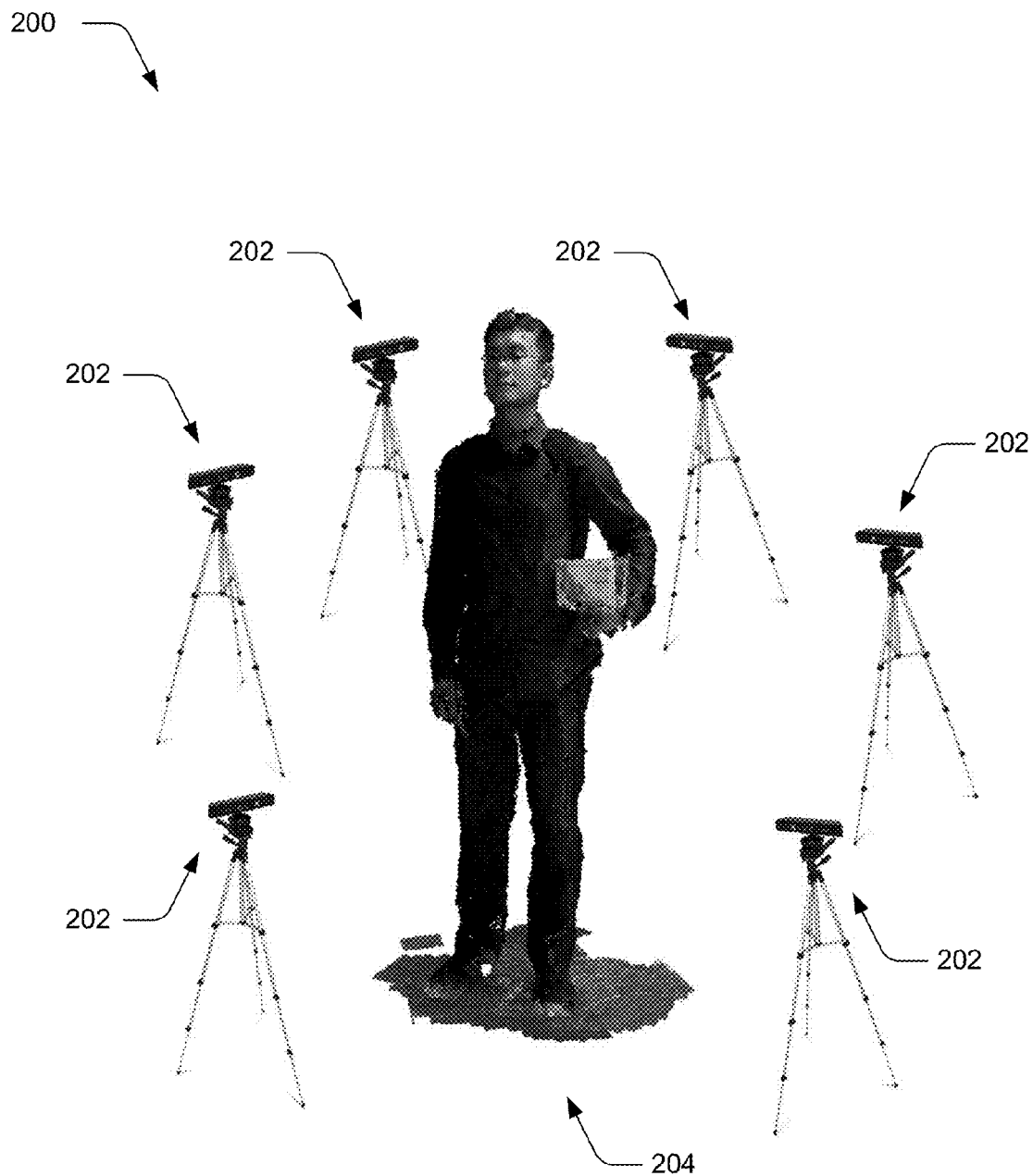
FIG. 2 is an illustration of an environment in an example implementation that is operable to capture scans.

FIG. 2 is an illustration of an environment 200 in an example implementation that is operable to capture scans. The illustrated environment 200 includes multiple image capture devices 202 and an object 204, which may be configured in a variety of ways. Additionally, the image capture devices 202 may be communicatively coupled to the computing device 102 and/or one or more service providers 106 over the network 108.

By way of example and not limitation, each of the multiple image capture devices 202 captures a different scan of the object 204 and may be configured similar to that of image capture device 104 of FIG. 1. The different scans represent the object 204 from different perspectives. The captured scans may be automatically aligned using the techniques described herein (e.g., via alignment module 114) regardless of whether the multiple image capture devices 202 are uncalibrated. Thus, automatic alignment of scans (i.e., does not require input from a user after scans are captured) is enabled regardless of whether a user freely moves one or more of the multiple image capture devices to a new position for scanning. Here, the uncalibrated image capture devices are not made aware of a depth of another device. It is contemplated, however, that in other scenarios the multiple image capture devices 202 are calibrated. One specific example of an image capturing device 202 includes a Red, Green, Blue plus Depth (RGB-D) camera.

In this example implementation, capture of six scans from different perspectives at substantially the same time is represented. Alternatively, scans from different perspectives may be captured at different times using a single image capture device. Either way, each scan represents an image of the object with keypoints that possibly align with keypoints of another scan. Naturally, greater or fewer number of scans may be captured in different scenarios.

Figure 3:
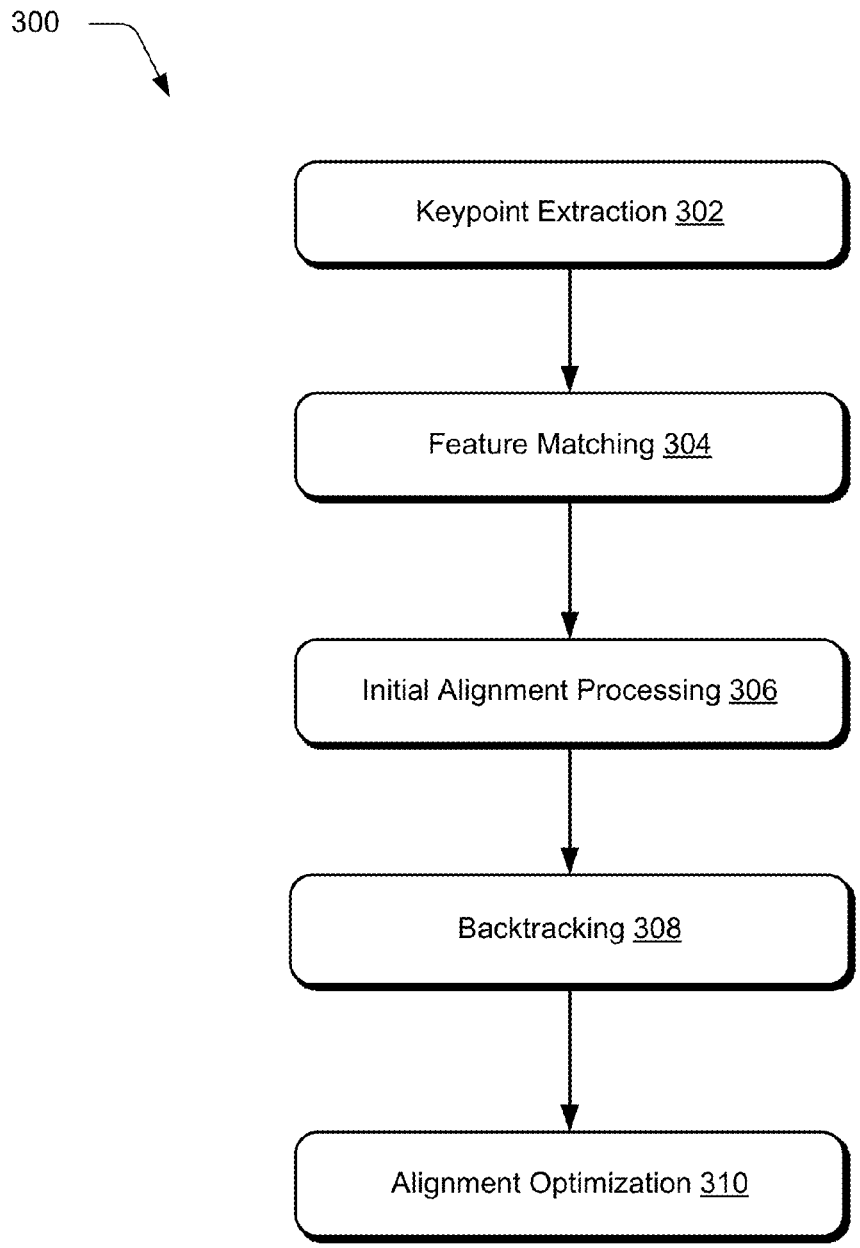
FIG. 3 depicts a representation of a scenario in an example implementation in which an alignment module performs alignment techniques to automatically align multiple scans.

FIG. 3 depicts generally at 300 a representation of a scenario in an example implementation in which the alignment module 114 of FIG. 1 performs alignment techniques to automatically align multiple scans. As represented in FIG. 3, the example implementation includes keypoint extraction 302, feature matching 304, initial alignment processing 306, back-tracking 308, and alignment optimization 310.

By way of example, scans from different perspectives may be obtained from multiple uncalibrated image capturing devices and input into the alignment module 114. The alignment module 114, for instance, may receive the scans captured by the image capture devices 202 as represented in FIG. 2.

Features may be identified as matching by extracting keypoints from each scan and grouping corresponding keypoints. That is, keypoints may be extracted (302) from each scan using any suitable extraction techniques. Extracted keypoints may be associated with a descriptor and saved in a point cloud library. In one specific example, keypoint extraction includes uniform sampling and filtering by saliency and/or anisotropy. In some instances, the alignment module 114 may be configured to generate a Signature of Histograms of Orientations (SHOT) descriptor to convey geometry and color information for each keypoint.

Feature correspondence between a pair of scans is determined using the extracted keypoints (304). The alignment module 114, for example, may use fast approximate nearest neighbor algorithms to match features between scans. Determining which of the scans to initially pair together may be based on the scan's position. That is, scans that are adjacent may be paired initially, though any of the scans may be paired together.

An initial alignment of the scans may be performed by the initial alignment module 116 (306). In one specific example the initial alignment may be determined by grouping matched features and applying any suitable iterative algorithm e.g., random access consensus (RANSAC). As a result, partial alignments between scans are formed.

In the initial alignment, at least some of the scans are identified as having multiple possible alignments, or paths, among matching keypoint features. For instance, a pair of scans may be aligned along several paths with each path representing a different partial alignment. In some implementations, the initial alignment module 116 may be configured to compute and/or assign an error value indicative of a minimum difference between the keypoint features of the pair of scans. Thus, each partial alignment may be associated with an error value to indicate a likelihood that the keypoint features match. Further, each partial alignment may be associated with a number of inliers e.g., points which can be approximately fitted to a line.

At times, however, a pair of scans that align nicely based on the assigned error value will introduce ambiguity when aligned with other scans. For this reason, different potential matches between the features of the scans may be considered. Accordingly, in at least some implementations the alignment module 114 may 'backtrack' to consider multiple partial alignments prior to selecting one for inclusion in a global alignment (308). For example, the alignment module 114 may process each of the multiple partial alignments despite one of the partial alignments being associated with an error that indicates strong correspondence in matched keypoint features.

Additionally or alternatively, 'backtracking' may include merging a pair of scans along one of the partial alignments and processing the merged pair of scans (and its respective matched keypoint features) relative to another scan or pair of scans. Processing the merged pair of scans relative to another scan or pair of scans may include various operations performed by the alignment optimizer module 118, some examples of which are described below. In one specific example, an error is computed that represents how well the partial alignment of the merged scans aligns with an addition scan. Here, the error is computed for the merged scans as a whole rather than for the individual scans that are merged. In some implementations, the computed error for the merged scans will be compared to a threshold to determine whether to accept or reject the merging of the scans along the partial alignment. A rejection to merge the scans along the partial alignment may cause 'backtracking' to select another partial alignment usable for merging the pair of scans.

Further, 'backtracking' may include forming one or more new partial alignments in response to rejecting the previously formed partial alignments. After selecting and processing several partial alignments for merging a pair of scans, it may be determined that the processed partial alignments are rejected for inclusion in the global alignment (as described below in association with the alignment optimizer module 118). In this case, at least one new partial alignment may be formed based on an error indicative of a minimum difference between the extracted keypoints and/or features of the pair of scans for which a partial alignment is desired. In some instances, 'backtracking' may continue until a partial alignment is accepted.

Alignment optimization may be performed by the alignment module 114 to generate the global alignment (310). In particular, alignment optimization includes employing the alignment optimizer module 118 to determine whether to accept or reject a partial alignment. A variety of different operations may be employed to accept or reject a partial alignment. Examples of these operations may include but are not limited to selecting a partial alignment for further analysis, analyzing the selected partial alignment relative to another scan or pair of scans, computing an error value associated with combining the partial alignment with additional keypoint features of the other scan(s), and/or comparing the computed error to a threshold established to prune partial alignments.

In some implementations, selecting a partial alignment for further analysis may be based on the assigned error indicative of a minimum difference between the keypoint features of the pair of scans. When multiple partial alignments between a pair of scans are formed, the partial alignment having the lowest error between their matched keypoint features may be selected for further analysis. Alternatively, in another implementation, a partial multiple alignment may be selected randomly. When only a single partial alignment is formed for a pair of scans, selection of the single partial alignment for further analysis may be automatic. Further analysis of the selected partial alignment may include one or more of the analyzing, the computing, and/or the comparing operations noted above.

Analyzing the selected partial alignment relative to another scan or pair of scans may include identifying keypoint features of the partial alignment that match keypoint features of the other scan or pair of scans. In addition or alternatively, analyzing the selected partial alignment may include combining or merging the keypoint features of the partial alignment with the additional keypoint features.

Responsive to the analyzing, an error value associated with combining the partial alignment with the additional keypoint features may be computed. For instance, an ICP error (e.g., point-to-plane error) value may be computed using an ICP algorithm.

The computed error may be compared to a threshold established to prune partial alignments in various ways. For instance, if the computed error is greater than the threshold, the partial alignment will be rejected whereas if the computed error is less than or equal to the threshold, the partial alignment will be accepted for inclusion in the global alignment. The threshold may be established as a value generated from a learning model.

Generally, automatically aligning multiple scans using the techniques described herein represents an improvement over processing scans individually. For instance, accuracy of aligning two scans having small overlap may be improved when the two scans are processed as a merged scan relative to another scan due to the merged scans generally having larger overlap.

Figure 4:
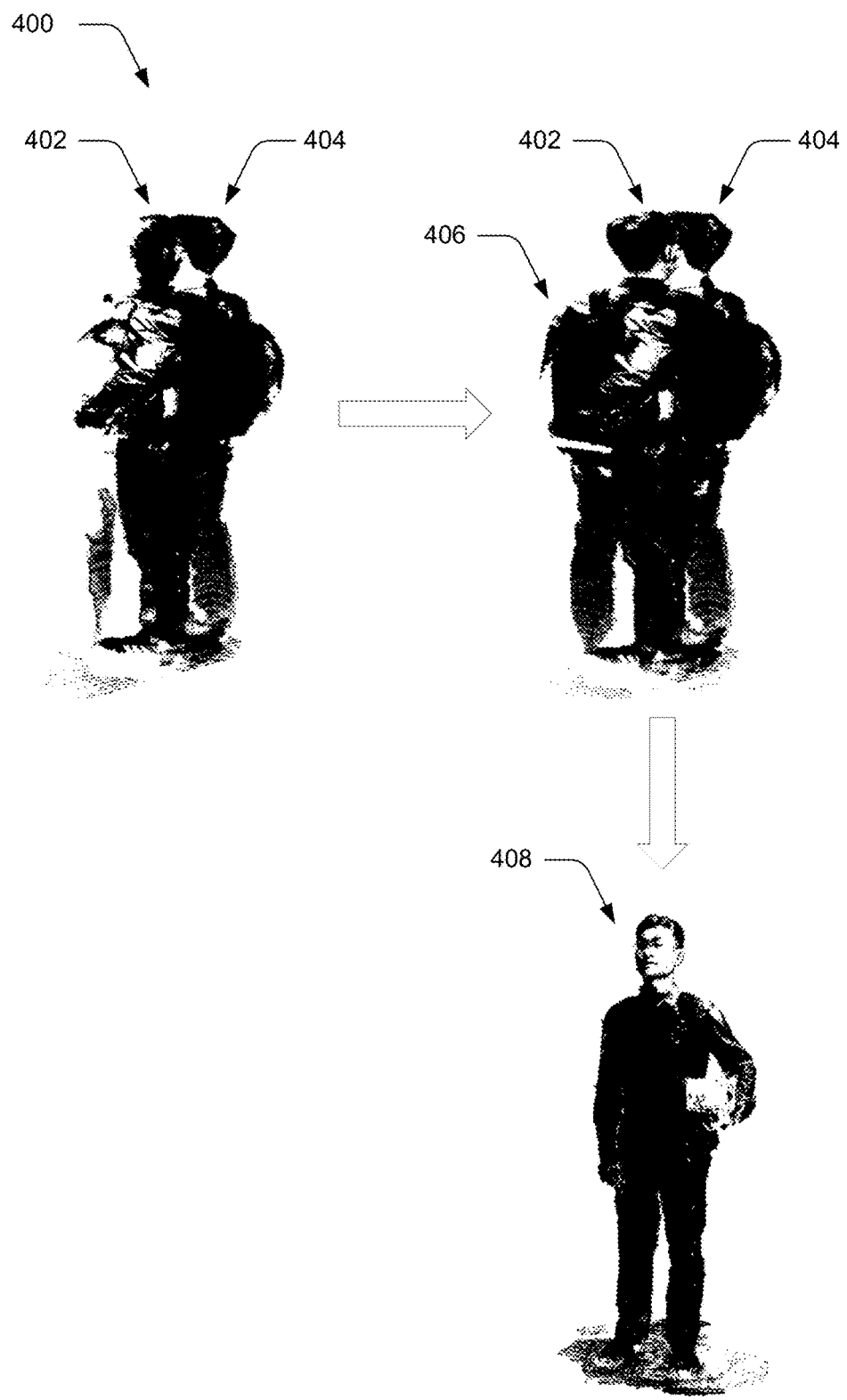
FIG. 4 depicts an example alignment using an alignment module to employ techniques described herein.

FIG. 4 depicts an example alignment 400 using the alignment module 114 of FIG. 1 to employ techniques described herein. For instance, as illustrated the example alignment 400 includes scans 402, 404, and 406, as well as a global alignment 408. As illustrated, each of the scans 402, 404, and 406 represent different perspectives of an individual e.g., object 204 of FIG. 2.

Collectively, scans 402 and 404 make a pair of scans having been aligned along a path of corresponding keypoints. Scans 402 and 404 represent a partial alignment which will be combined with additional keypoint features of scan 406. To produce the global alignment 408, the partial alignment was determined to be accepted based on the alignment module 114 computing an error for combining the matched keypoints of scans 402 and 404 with the keypoints of scan 406. In this specific example, the comparison of the computed error to a threshold indicates that the partial alignment is to be accepted. Responsive to accepting the partial alignment, the matched keypoint features within the partial alignment may be combined with keypoint features within the additional scan to produce the global alignment 408.

In the event that the computed error indicated that the partial alignment is to be rejected, then an additional partial alignment made from scans 402 and 404, or different scans not shown, will be processed. By way of example, responsive to rejecting the partial alignment, a new error associated with combining an alternative partial alignment made from scans 402 and 404 with additional keypoint features (e.g., associated with an additional scan of the object) is computed. A determination of whether to accept or reject the additional partial alignment may be made based on comparing the computed new error to the threshold.

Various actions such as analyzing, comparing, assigning, computing, generating, determining, and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. Moreover, a particular module may be configured to cause performance of action directly by the particular module. In addition or alternatively the particular module may cause particular actions by invoking or otherwise accessing other components or modules to perform the particular actions (or perform the actions in conjunction with that particular module).

Example Procedures

The following discussion describes alignment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, any one or more blocks of the procedure may be combined together or omitted entirely in different implementations. Moreover, blocks associated with different representative procedures and corresponding figures herein may be applied together. Thus, the individual operations specified across the various different procedures may be used in any suitable combinations and are not limited to the particular combinations represented by the example figures. In portions of the following discussion, reference may be made to the examples of FIGS. 1-4.

Figure 5:
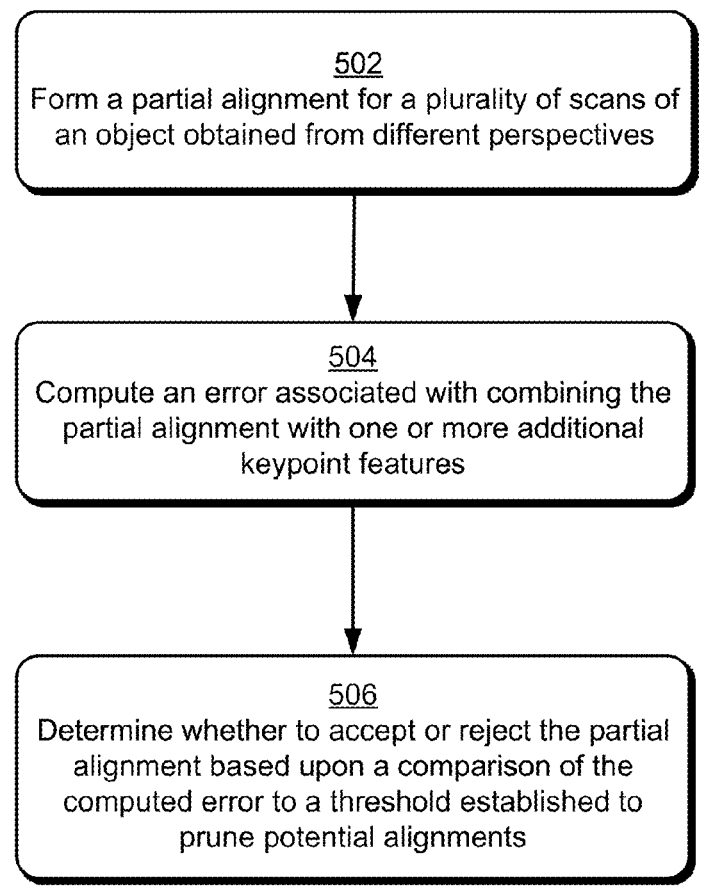
FIG. 5 is a flow diagram depicting a procedure in which an alignment module determines whether to accept or reject a partial alignment for a plurality of scans.

FIG. 5 is a flow diagram depicting a procedure 500 in which the alignment module 114 of FIG. 1 determines whether to accept or reject a partial alignment for a plurality of scans.

A partial alignment is formed for a plurality of scans of an object obtained from different perspectives (block 502). For example, the alignment module 114 may form the partial alignment using any of the techniques described herein. In particular, the alignment module 114 may form the partial alignment by recognizing keypoint features within the plurality of scans, assigning error values to potential matches between keypoint features of the plurality of scans, and/or matching two or more keypoint features using the assigned error values to produce the partial alignment.

An error associated with combining the partial alignment with one or more additional keypoint features is computed (block 504). For instance, the alignment module 114 may compute the error using an ICP algorithm that identifies an ICP error. In one or more implementations, the error between the partial alignment and additional keypoint features may be computed prior to determining whether a global alignment for the scans is to include the partial alignment.

A determination is made regarding whether to accept or reject the partial alignment based upon a comparison of the computed error to a threshold established top prune potential alignments (block 506). For instance, the alignment optimizer module 118 may perform the comparison between the computed error and the threshold. In an implementation in which the partial alignment is accepted, a global alignment will include the accepted partial alignment. In an implementation in which the partial alignment is rejected, the global alignment will not include the rejected partial alignment and an additional partial alignment will be selected for processing.

Figure 6:
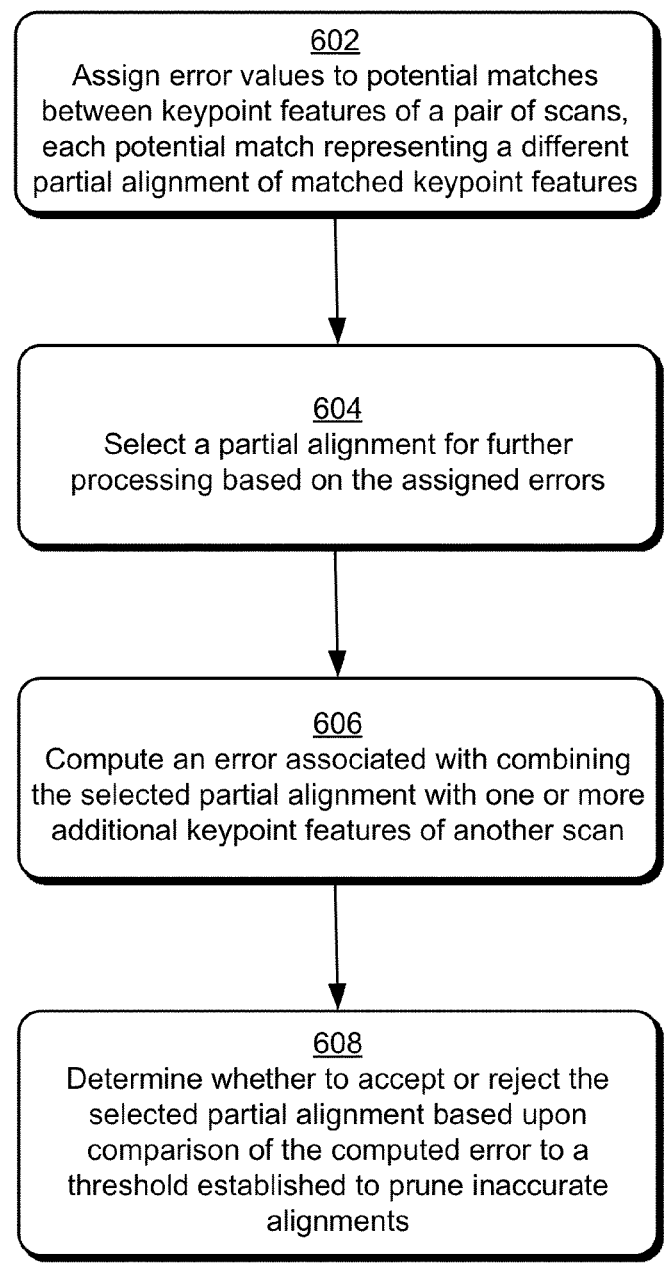
FIG. 6 is a flow diagram depicting a procedure in which an alignment module selects and processes one of multiple potential matches between a pair of scans.

FIG. 6 is a flow diagram depicting a procedure 600 in which the alignment module 114 of FIG. 1 selects and processes one of multiple potential matches between a pair of scans.

Error values are assigned to potential matches between keypoint features of a pair of scans (block 602). For example, the alignment module 114 may assign error values to the potential matches as discussed herein in relation to FIGS. 1-4 and elsewhere. For instance, each respective error value may be indicative of a degree of matching between the keypoint features. Here, each potential match represents a different partial alignment of matched keypoint features.

A partial alignment is selected for further processing based on the assigned errors (block 604). For instance, the alignment module 114 may select the partial alignment associated with the lowest error between matched keypoint features of the pair of scans.

An error associated with combining the selected partial alignment with one or more additional keypoint features of another scan is computed (606). For instance, the alignment module 114 may compute the error using an ICP algorithm that identifies an ICP error.

Whether to accept or reject the selected partial alignment based upon comparison of the computed error to a threshold established to prune inaccurate alignments is determined (608). For instance, the alignment optimizer module 118 may perform the comparison between the computed error and the threshold.

Example System and Device

Figure 7:
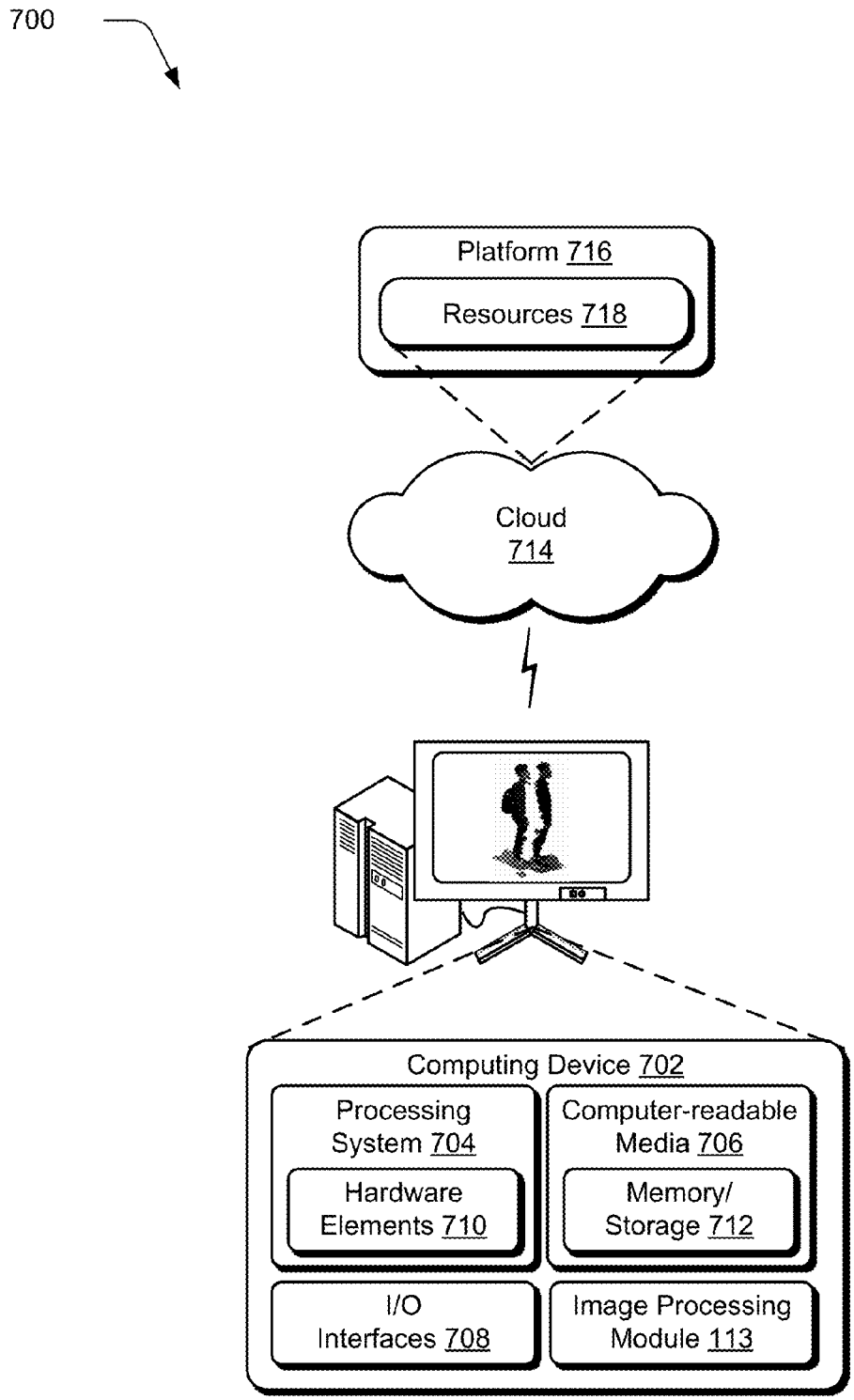
FIG. 7 illustrates an example system including an example device that is representative of one or more computing systems and/or devices that may implement the various techniques described herein.

FIG. 7 illustrates an example system 700 that, generally, includes an example computing device 702 that is representative of one or more computing systems and/or devices that may implement the various techniques described herein. This is illustrated through inclusion of the image processing module 113, which may be configured to align scans. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in at least some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device, the method comprising:
    forming a partial alignment for a plurality of scans of an object obtained from different perspectives including:
    recognizing keypoint features within the plurality of scans;
    assigning error values to potential matches between keypoint features of the plurality of scans;
    matching two or more keypoint features using the assigned error values to produce the partial alignment;
    computing an error associated with combining the partial alignment with one or more additional keypoint features; and
    determining whether to accept or reject the partial alignment based upon comparison of the computed error to a threshold established to prune potential alignments.

2. A method as described in claim 1, wherein each of the potential matches between the keypoint features of the plurality of scans is assigned a respective error value to indicate a degree of matching between the keypoint features and the partial alignment is formed using the potential match associated with the lowest assigned error among the assigned errors of the potential matches.

3. A method as described in claim 2, further comprising, responsive to rejecting the partial alignment, computing a new error associated with combining an alternative partial alignment with the one or more additional keypoint features and determining whether to accept or reject the alternative partial alignment based upon comparison of the computed new error to the threshold.

4. A method as described in claim 1, wherein the one or more additional keypoint features are associated with an additional scan of the object.

5. A method as described in claim 1, further comprising, responsive to accepting the partial alignment, combining the matched keypoint features within the partial alignment with keypoint features within an additional scan to produce a global alignment of the plurality of scans and the additional scan.

6. A method as described in claim 1, further comprising generating an alignment graph and using the alignment graph to enable the forming and the computing.

7. A method as described in claim 1, further comprising producing a three-dimensional (3D) model representation of the object using the accepted partial alignment.

8. A system comprising:
    a processor; and
    a memory, storing instructions that, responsive to execution by the processor, configures the processor to:
    form a partial alignment for a plurality of scans of an object obtained from different perspectives by an image capturing device, to form the partial alignment including:
    recognize keypoint features within the plurality of scans;
    assign an error value to a potential match between keypoint features of the plurality of scans;
    match two or more keypoint features using the assigned error value to produce the partial alignment;
    compute an error associated with combining the partial alignment with one or more additional keypoint features; and
    determine whether to accept or reject the partial alignment based upon comparison of the computed error to a threshold established to prune potential alignments.

9. A system as described in claim 8, wherein the processor is further configured to reject the partial alignment responsive to the computed error being greater than the threshold.

10. A system as described in claim 8, wherein the processor is further configured to form an alternative partial alignment for the plurality of scans of the object, the alternative partial alignment being associated with a different potential match between the keypoint features of the plurality of scans.

11. A system as described in claim 10, wherein the processor is further configured to select the partial alignment or the alternative partial alignment for use as a final alignment for the plurality of scans of the object.

12. A system as described in claim 10, wherein the processor is further configured to compute an error associated with combining the alternative partial alignment with one or more additional keypoint features prior to determining whether to accept or reject the partial alignment.

13. A system as described in claim 8, wherein the processor is further configured to consider an alternative partial alignment for the plurality of scans of the object prior to determining whether to accept or reject the partial alignment.

14. A system as described in claim 8, wherein the processor is further configured to select the partial alignment or an alternative partial alignment for use in a global alignment for the plurality of scans of the object.

15. A system as described in claim 8, wherein combining the partial alignment with the one or more additional keypoint features includes combining the matched two or more keypoint features of the partial alignment to the one or more additional keypoint features of an additional scan.

16. A system as described in claim 8, wherein the plurality of scans of the object are obtained from a plurality of image capture devices at a substantially same time.

17. One or more non-transitory computer-readable storage media storing instructions that, responsive to execution by a computing device, cause the computing device to perform operations to produce a three-dimensional (3D) model representation of an object, the operations comprising:
- assigning error values to potential matches between keypoint features of a pair of scans, each potential match representing a different partial alignment of matched keypoint features corresponding to the pair of scans;
- selecting a partial alignment for further processing based on the assigned errors;
- computing an error associated with combining the selected partial alignment with one or more additional keypoint features of another scan; and
- determining whether to accept or reject the selected partial alignment based upon comparison of the computed error to a threshold established to prune potential alignments.

18. One or more non-transitory computer-readable storage media as described in claim 17, wherein the instructions cause the computing device to perform further operations comprising rejecting the selected partial alignment and repeating the computing and the determining for another partial alignment.

19. One or more non-transitory computer-readable storage media as described in claim 17, wherein the pair of scans and the other scan includes a representation of an object from a different perspective.

20. One or more non-transitory computer-readable storage media as described in claim 17, wherein the instructions cause the computing device to perform further operations comprising including the selected partial alignment in a global alignment responsive to accepting the selected partial alignment.

* * * * *